(12) United States Patent
Elmas

(10) Patent No.: US 12,252,213 B1
(45) Date of Patent: Mar. 18, 2025

(54) ADJUSTABLE CYCLE PEDAL SYSTEM

(71) Applicant: Ismail Elmas, Vienna, VA (US)

(72) Inventor: Ismail Elmas, Vienna, VA (US)

( * ) Notice: Subject to any disclaimer, the term of this patent is extended or adjusted under 35 U.S.C. 154(b) by 0 days.

(21) Appl. No.: 18/901,867

(22) Filed: Sep. 30, 2024

(51) Int. Cl.
*B62M 3/08* (2006.01)
*A63B 21/00* (2006.01)

(52) U.S. Cl.
CPC ........... *B62M 3/08* (2013.01); *A63B 21/4034* (2015.10)

(58) Field of Classification Search
CPC .............................. B62M 3/08; A63B 21/4034
USPC ................................ 74/594.4, 594.7; 482/57
See application file for complete search history.

(56) References Cited

U.S. PATENT DOCUMENTS

| | | | |
|---|---|---|---|
| 3,457,803 A | | 7/1969 | Sykes et al. |
| 4,599,915 A | | 7/1986 | Hlavac et al. |
| 5,161,430 A | * | 11/1992 | Febey ............... B62M 3/02 74/594.1 |
| 5,336,147 A | | 8/1994 | Sweeney |
| 5,634,382 A | | 6/1997 | Fan |
| 5,927,155 A | * | 7/1999 | Jackson ............... B62M 3/08 74/594.4 |
| 6,688,192 B1 | | 2/2004 | Badarneh |
| 7,228,760 B2 | | 6/2007 | Reboullet |
| 7,918,768 B2 | | 4/2011 | Rogozinski |
| 8,388,009 B1 | * | 3/2013 | Smith ............... B62H 1/08 280/294 |
| 10,029,143 B1 | | 7/2018 | Milstein et al. |
| 2008/0011121 A1 | | 1/2008 | Topfer |
| 2009/0229405 A1 | * | 9/2009 | White ............... B62M 3/08 74/594.7 |
| 2013/0061715 A1 | | 3/2013 | Kim |
| 2020/0148302 A1 | * | 5/2020 | Gatto ............... B62K 13/00 |

FOREIGN PATENT DOCUMENTS

| | | | | |
|---|---|---|---|---|
| CN | 201729217 U | | 2/2011 | |
| DE | 202016005888 U1 | | 10/2016 | |
| EP | 2535253 A1 | | 12/2012 | |
| FR | 2661651 A1 | | 11/1991 | |
| GB | 1446865 A | * | 8/1976 | ............... A47F 5/04 |
| KR | 100506195 B1 | | 8/2005 | |

(Continued)

OTHER PUBLICATIONS

Is a recess a hole? Microsoft Bing, Nov. 17, 2024 (Year: 2024).*

*Primary Examiner* — Vinh Luong
(74) *Attorney, Agent, or Firm* — MH2 Technology Law Group, LLP

(57) ABSTRACT

A pedal assembly for a pedal operated device, including: a pedal configured to receive an appendage of a user; a telescoping pedal arm; a plurality of telescoping portions; and a pedal arm retention portion that provides a predetermined resistance to the relative movement of two adjacent ones of the telescoping portions. The pedal arm retention portion has a first recess formed in one of the telescoping portions, a second recess formed in one of the telescoping portions, an engagement portion that is configured to be received in the first recess and the second recess, and a resilient portion that urges the engagement portion into one of the recesses. The plurality of telescoping portions permit the length of the pedal arm to be adjusted, and the pedal arm retention portion is configured such that the predetermined resistance is overcome by moving the pedal in the longitudinal direction.

22 Claims, 10 Drawing Sheets

(56) References Cited

FOREIGN PATENT DOCUMENTS

| KR | 101991243 | B1 | 6/2019 |
|---|---|---|---|
| TW | I423832 | B | 1/2014 |
| WO | 2016013865 | A1 | 1/2016 |
| WO | 2017018884 | A1 | 2/2017 |

* cited by examiner

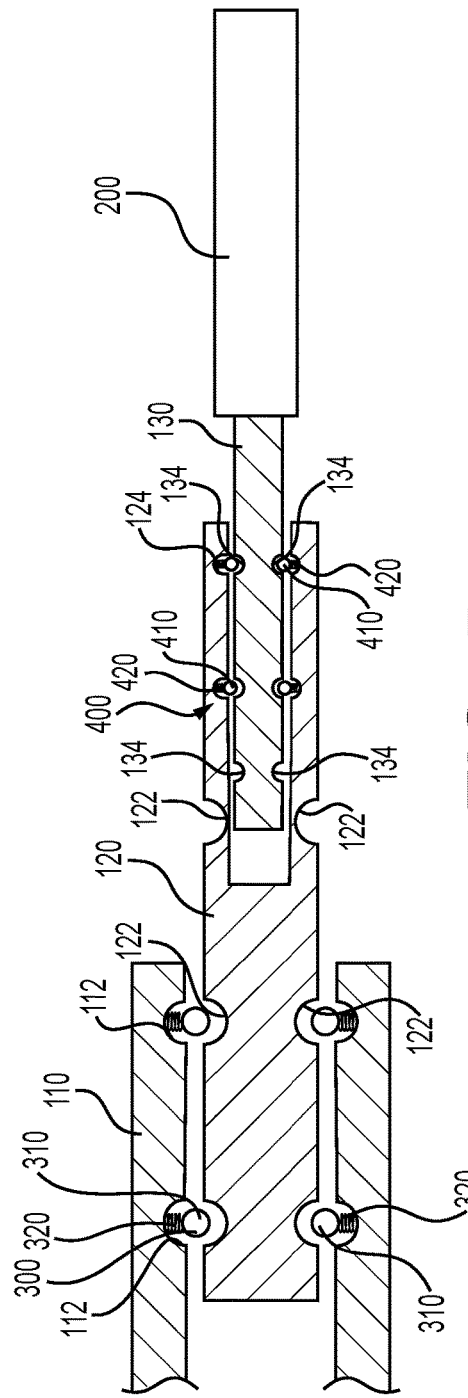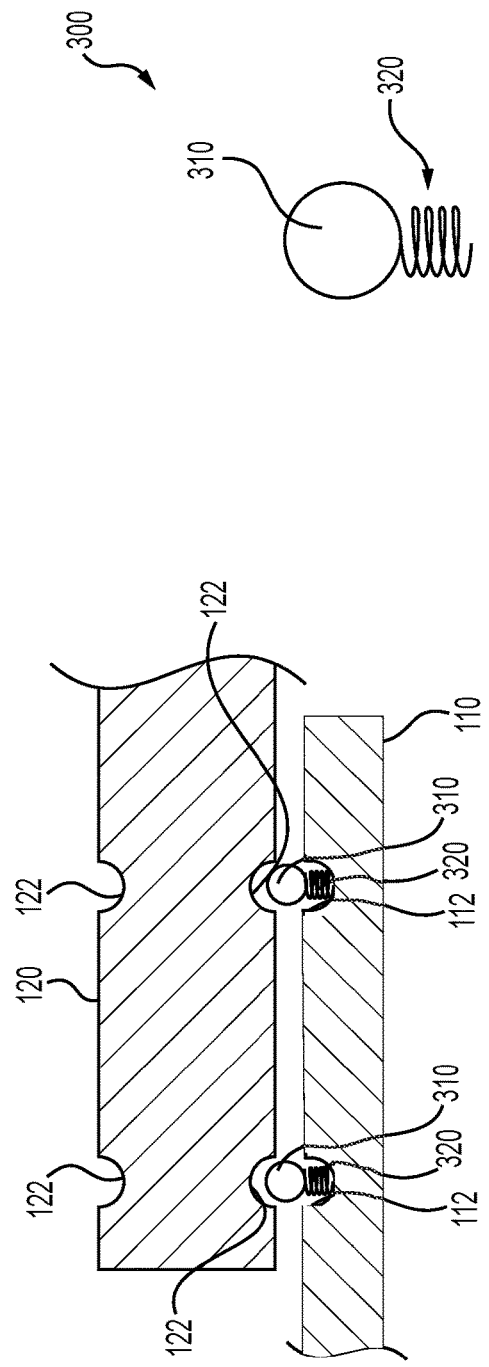

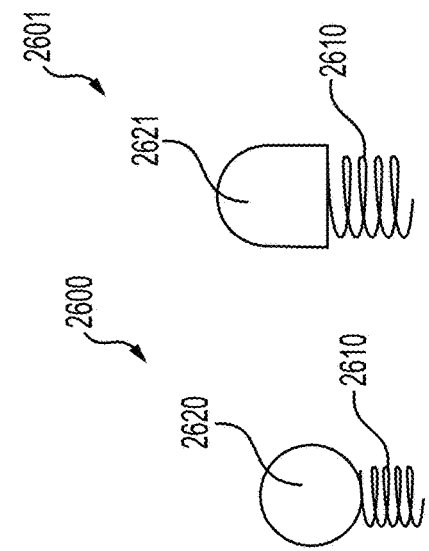
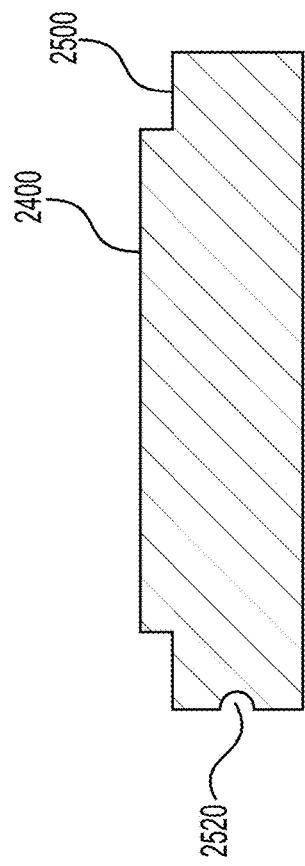
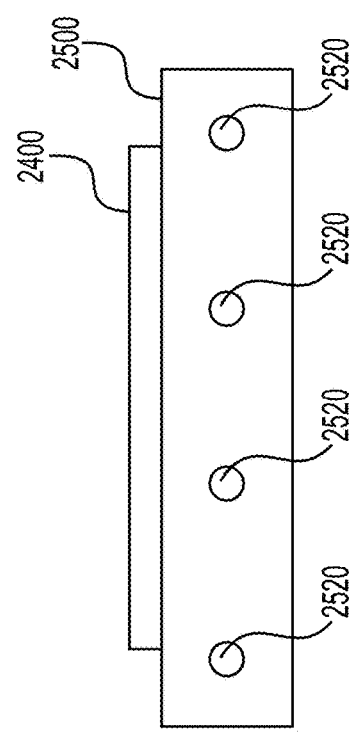
FIG. 18   FIG. 19   FIG. 20   FIG. 21

ADJUSTABLE CYCLE PEDAL SYSTEM

FIELD OF THE INVENTION

The invention is directed to a pedal system for a pedal-powered machine or vehicle. More particularly, embodiments of the invention are directed to an adjustable pedal system for a stationary pedal exercise machine, bicycle, tricycle, or other pedal powered vehicle or machine.

An example of an application for the invention is an exercise and/or rehabilitation stationary cycle including an adjustable pedal-mount.

BACKGROUND OF THE INVENTION

Some exercise machines such as, for example, stationary exercise bicycles, have a pedal system that receives the feet of a user of the machine. The force applied by the user to pedals of the pedal system is transmitted to a resistance mechanism by way of a crank and a pedal arm that extends from the crank to each of the pedals. The user exercises by applying force to the pedals which is resisted by the resistance mechanism.

Applicant recognized an improvement to the above arrangements and implements those improvements in embodiments of the invention.

SUMMARY

The invention achieves the benefit of varying the muscles exercised (or the portions of the muscles exercised) and/or engagement of ligaments and/or tendons by the exercise machine by providing adjustability in length of the pedal arm and/or a rotated angle of the pedal relative to the pedal arm.

Embodiments of the invention are based on the inventor's recognition that varying the length of the pedal arm and/or the rotated angle of the pedal relative to the pedal arm provides an improved exercise experience. This improved experience results from the user being able to modify various angles of their hips, knees, and/or ankles to reduce fatigue and/or change the muscles (or the portions of the muscles) and/or the engagement of ligaments and/or tendons exercised.

Particular embodiments of the disclosure are directed to a pedal assembly for a pedal operated device, including: a pedal configured to receive an appendage of a user of the pedal operated device; a telescoping pedal arm having a first end, a second end opposite the first end, and a plurality of telescoping portions that move relative to each other; and a pedal arm retention portion that provides a predetermined resistance to the relative movement of two adjacent ones of the telescoping portions. The pedal arm retention portion has a first recess formed in a first one of the telescoping portions, a second recess formed in a second one of the telescoping portions, an engagement portion that is configured to be received in the first recess and the second recess, and a resilient portion that urges the engagement portion into one of the first recess and the second recess. The pedal arm has a length in a longitudinal direction between the first end and the second end. The pedal is attached to the first end of the pedal arm. The second end of the pedal arm is configured to be attached to the pedal operated device. The plurality of telescoping portions permit the length of the pedal arm to be adjusted. The pedal arm retention portion is configured such that the predetermined resistance is overcome by moving the pedal in the longitudinal direction.

In some embodiments, the length of the pedal arm is adjustable without disassembling any portion of the pedal arm.

In some embodiments, the pedal arm comprises a first portion attached to the pedal, and including the first end of the pedal arm, a third portion configured to be attached to the pedal operated device, and including the second end of the pedal arm, and a second portion attached to the first portion and the third portion.

In some embodiments, first portion telescopes inside the second portion, and the second portion telescopes inside the third portion.

In some embodiments, the resilient portion is a spring.

In some embodiments, the engagement portion is a sphere.

In some embodiments, the engagement portion has a hemispherical end that is configured to be received in one of the first recess and the second recess, and a cylindrical end that is configured to be received in another of the first recess and the second recess.

In some embodiments, each of the telescoping portions comprise a plurality of the first recess.

In some embodiments, the engagement portion is pushed toward the resilient portion by one of the first recess and the second recess contacting the engagement portion as a result of the pedal moving in the longitudinal direction.

In some embodiments, the pedal comprises a base portion that is attached to the pedal arm, and a rotating portion that is rotatingly attached to the base portion.

Some embodiments further comprise a pedal retention portion that provides a rotational predetermined resistance to a rotational movement of the rotating portion relative to the base portion, the pedal retention portion having a first pedal recess formed in the base, a second pedal recess formed in the rotating portion, a pedal engagement portion that is configured to be received in the first pedal recess and the second pedal recess, and a pedal resilient portion that urges the pedal engagement portion into one of the first pedal recess and the second pedal recess.

In some embodiments, the pedal retention portion is configured such that the rotational predetermined resistance is overcome by rotating the rotating portion relative to the base portion.

In some embodiments, the rotating portion is rotatable relative to the base portion without disassembling any portion of the pedal.

In some embodiments, the pedal is configured to receive a foot of the user.

In some embodiments, the pedal is configured to receive a hand of the user.

Other embodiments of the disclosure are directed to a pedal operated exercise machine, including: a main body; a hand support; a seat; and a pedal assembly. The pedal assembly has: a pedal configured to receive an appendage of a user of the pedal operated device; a telescoping pedal arm having a first end, a second end opposite the first end, and a plurality of telescoping portions that move relative to each other; and a pedal arm retention portion that provides a predetermined resistance to the relative movement of two adjacent ones of the telescoping portions. The pedal arm retention portion has a first recess formed in a first one of the telescoping portions, a second recess formed in a second one of the telescoping portions, an engagement portion that is configured to be received in the first recess and the second recess, and a resilient portion that urges the engagement portion into one of the first recess and the second recess.

In some embodiments, the pedal arm has a length in a longitudinal direction between the first end and the second end.

In some embodiments, the pedal is attached to the first end of the pedal arm, and the second end of the pedal arm is configured to be attached to the pedal operated device.

In some embodiments, the plurality of telescoping portions permit the length of the pedal arm to be adjusted.

In some embodiments, the pedal arm retention portion is configured such that the predetermined resistance is overcome by moving the pedal in the longitudinal direction.

In some embodiments, the length of the pedal arm is adjustable without disassembling any portion of the pedal arm.

In some embodiments, the pedal comprises a base portion that is attached to the pedal arm, and a rotating portion that is rotatingly attached to the base portion.

In some embodiments, the pedal is configured to receive a foot of the user.

In some embodiments, the pedal is configured to receive a hand of the user.

Other embodiments of the disclosure are directed to a pedal assembly for a pedal operated device, including: a telescoping pedal arm having a first end, a second end opposite the first end, and a plurality of telescoping portions that move relative to each other; and a pedal. The pedal has a base portion that is attached to the pedal arm, a rotating portion that is rotatingly attached to the base portion, and a pedal retention portion that provides a rotational predetermined resistance to a rotational movement of the rotating portion relative to the base portion. The pedal retention portion has a first pedal recess formed in the base, a second pedal recess formed in the rotating portion, a pedal engagement portion that is configured to be received in the first pedal recess and the second pedal recess, and a pedal resilient portion that urges the pedal engagement portion into one of the first pedal recess and the second pedal recess.

In some embodiments, the pedal retention portion is configured such that the rotational predetermined resistance is overcome by rotating the rotating portion relative to the base portion.

In some embodiments, the rotating portion is rotatable relative to the base portion without disassembling any portion of the pedal.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein:

FIG. 5 is a partial sectional view of an exemplary pedal arm in accordance with embodiments of the disclosure;

FIG. 6 is a magnified partial sectional view of the pedal arm of FIG. 5;

FIG. 7 is a side view of a resilient retention device of the embodiment of FIG. 5;

FIG. 18 is a sectional view of an exemplary pedal of the pedal assembly of FIG. 16;

FIG. 19 is a side view the pedal of FIG. 18;

FIG. 20 is a side view of a resilient retention device of the embodiment of FIG. 16;

FIG. 21 is a side view of an alternate resilient retention device of the embodiment of FIG. 16;

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

As explained above, embodiments of the disclosure achieve the benefit of varying the muscles exercised (or the portions of the muscles exercised) by an exercise machine by providing adjustability in length of the pedal arm and/or a rotated angle of the pedal relative to the pedal arm. In embodiments, these adjustments can be made while the user is in the operating position on the machine.

While embodiments are described with reference to a stationary exercise cycle, it is noted that the terms "exercise machine", "pedal operated exercise machine", and "pedal operated device", include stationary cycles and bicycles used for transportation. It is also noted that while embodiments are described with reference to a cycle or bicycle, it is noted that embodiments also apply to pedal operated devices that have fewer or more than two wheels.

Figure 1:
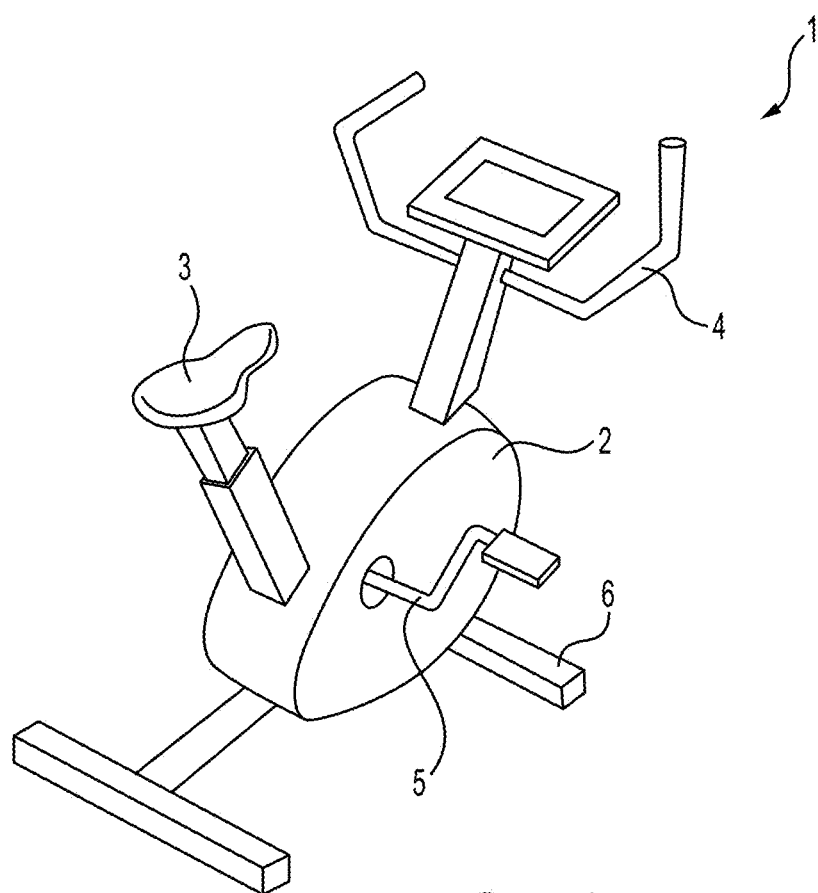
FIG. 1 is a perspective view of an exemplary exercise machine.

FIG. 1 shows an example of a stationary exercise bicycle 1 in accordance with embodiments of the disclosure that has a main body 2, a seat 3, handlebars 4, a pedal mechanism 5, and a base 6. In this embodiment, the pedal mechanism 5 has a bar extending from within the main body connecting a pedal to an internal resistance mechanism.

It is noted that embodiments of the disclosure include complete exercise or other machines as well as retrofittable devices that can be attached to existing exercise of other machines.

Figure 2:
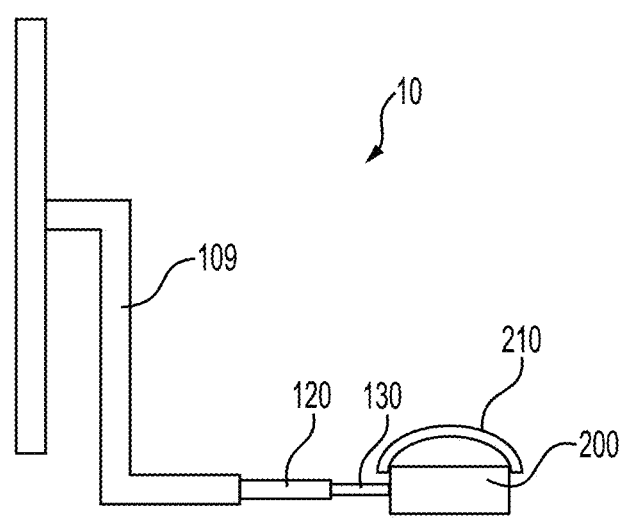
FIG. 2 is a front view of an exemplary pedal arm and pedal assembly in accordance with embodiments of the disclosure.

FIG. 2 shows one example of a pedal arm and pedal assembly 10 in accordance with embodiments of disclosure. In this example, assembly 10 includes a first pedal arm portion 130, a second pedal arm portion 120, and a third pedal arm portion (in this case, including a crank) 109, and a pedal 200. In operation, a user transfers force from their foot to the pedal 200 to cause the assembly to rotate. The rotation is resisted by a resistance mechanism such as, for example, an internal resistance mechanism in a stationary bicycle, or the force needed to propel a bicycle used for transportation. In embodiments, a strap or other securing structure 210 is attached to the pedal 200 to help the user maintain contact/connection with the pedal 200. The strap 210 assists the user in maintaining force transfer for both the pedaling action and adjustment of the pedal position by, for example, telescoping the various pedal arm portions (discussed in more detail below).

Figure 3:
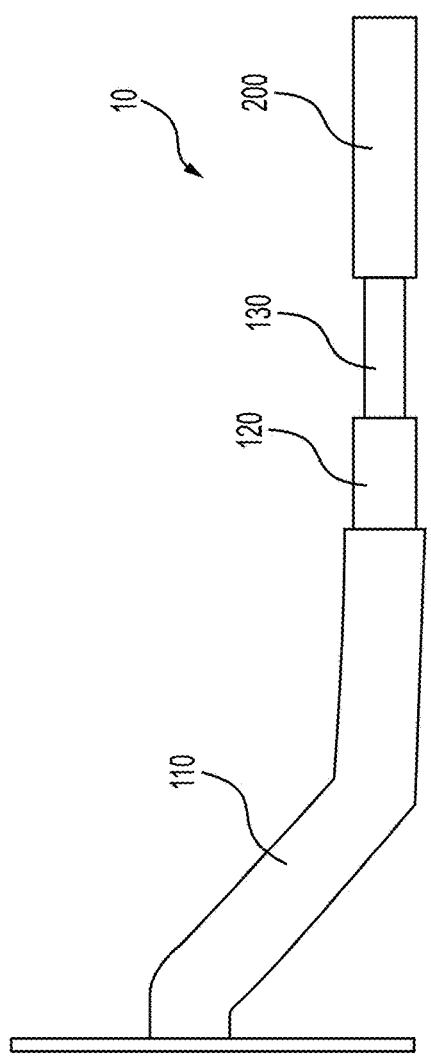
FIG. 3 is a front view of an exemplary pedal arm and pedal assembly in accordance with embodiments of the disclosure.
Figure 4:
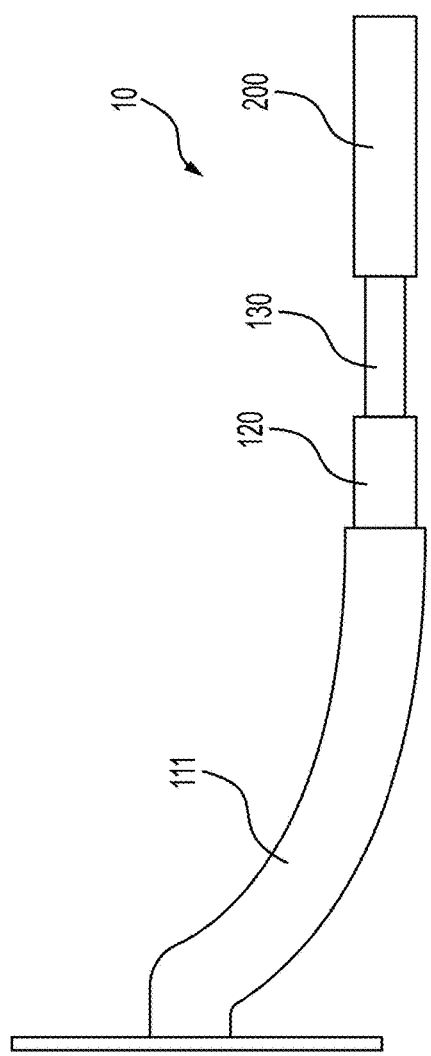
FIG. 4 is a front view of an exemplary pedal arm and pedal assembly in accordance with embodiments of the disclosure.

FIGS. 3 and 4 show alternate embodiments of the third pedal arm portion having shapes different to that of the pedal arm portion 109 shown in FIG. 2. In FIG. 3, the third pedal arm portion 110 is angular, but has angles other than 90°. In FIG. 4, the third pedal arm portion 111 is curved.

FIGS. 5-7 show an exemplary embodiment of a telescoping pedal arm in accordance with embodiments of the disclosure. This example, the pedal 200 is connected to a first pedal arm portion 130 such that the pedal 200 can rotate relative to the first pedal arm portion 130. The first pedal arm portion 130 is received in a recess in a second pedal arm portion 120 such that the first pedal arm portion 130 (and thus the pedal 200) can move laterally relative to the second pedal arm portion 120. Similarly, the second pedal arm portion 120 is received in a recess in a third pedal arm portion 110 such that the second pedal arm portion 120 can move laterally relative to the third pedal arm portion 110.

One or more pedal arm retention portions 300 are located between the second pedal arm portion 120 and the third pedal arm portion 110 to adjustably (in a lateral direction) hold the second petal arm portion 120 relative to the third pedal arm portion 110 (explained in more detail below). Similarly, one or more pedal arm retention portions 400 are located between the first pedal arm portion 130 and the second pedal arm portion 120 to adjustably (in a lateral direction) hold the first pedal arm portion 130 relative to the second pedal arm portion 120 (explained in more detail below).

FIG. 6 is a magnified portion of FIG. 5 and shows second pedal arm portion 120 having a plurality of recesses 122 in an outer surface of the second pedal arm portion 120. Also shown in FIG. 6 is a portion of the third pedal arm portion 110 having a plurality of recesses 112 in an inner surface of the third pedal arm portion 110. The pedal arm retention portion 300 is shown, in this example, as having an engagement portion, for example, a sphere, 310 and a resilient portion, for example, a spring, 320. In this example, the spring 320 and a portion of the sphere 310 are located in the recess 112, and another portion of the sphere 310 is located in the recess 122 when the recess 112 and the recess 122 are aligned. While the figures are drawn showing a significant amount of space within the recesses 112, 122 and around the sphere 310 for clarity, it is noted that in application, sphere 310 fits much more closely in the recesses 110, 122.

The mechanisms explained with reference to the pedal arm retention portions 300 in FIG. 6 also applied to the pedal arm retention portions 400 showing FIG. 5. FIG. 5 shows the various parts of the pedal arm in a secured position in which the pedal arm retention portions 300, 400 are engaged with the recesses 122, 134. The first pedal arm portion 130 can be pulled out of second pedal arm portion 120 to extend the pedal 200 laterally. In FIG. 5, this would cause the pedal arm retention portions 400 to be pushed radially outward (in the case of the pedal arm portions being circular) so that the spheres 410 are pressed back into the recesses 124 in the second pedal arm portion 120 such that first pedal arm portion 130 can then be moved laterally relative to the second pedal arm portion 120. The second pedal arm portion 120 can be moved relative to third pedal arm portion 110 in the same manner. While the example shown in FIG. 5 has a certain number of recesses 112, 122, 124, 134, it is noted that any number of recesses can be used in first pedal arm portion 130, the second pedal arm portion 120, and/or the third pedal arm portion 110.

FIG. 7 shows the pedal arm retention portion 300 having a sphere, for example, a ball bearing, 310 and a resilient portion, for example, a spring, 320. In embodiments, this same configuration is used for the pedal arm prevention portion 400.

Figure 10:
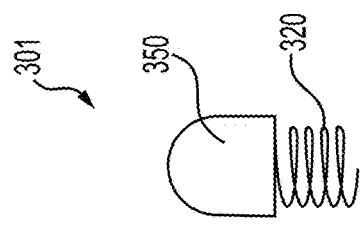
FIG. 10 is a side view of a resilient retention device of the embodiment of FIG. 8.
Figure 8:
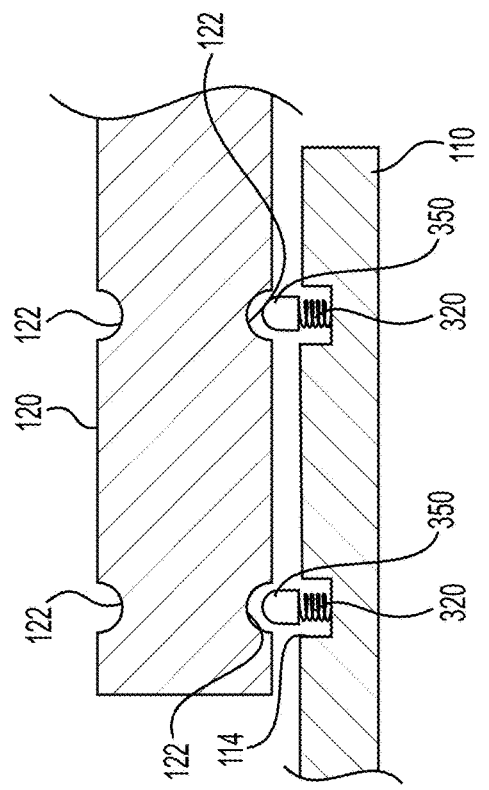
FIG. 8 is a magnified partial sectional view of an alternate retention mechanism of the pedal arm of FIG. 5.
Figure 9:
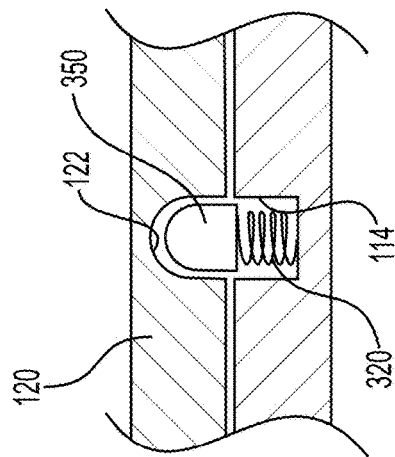
FIG. 9 is a magnified partial sectional view of the pedal arm of FIG. 8.

The embodiment shown in FIGS. 8-10 is similar to the embodiment shown in FIGS. 5-7, but has different shaped recesses on the, in this example, interior surfaces of the various portions of the pedal arm, and has a different shaped engagement portion of the pedal arm retention portion. In this example, as shown in FIG. 8, recesses 114 in the inner surface of the third pedal arm portion 110 are rectangular in cross section, as opposed to circular in cross section as in the example shown in FIG. 5. In this example, the bottom of the recess 114 is round to accommodate an engagement portion 350 that has a round, flat base and a hemispherical end that is configured to engage the recess 122 in the second pedal arm portion 120. This configuration of the engagement portion 350 and the spring 320 is shown in FIG. 10.

The embodiments described with reference to FIGS. 5-10 permit the length of the pedal arm to be changed by a user while using the pedal operated device without having to perform any disassembly. For example, by the user applying force to the pedal by way of a strap, friction, or other engagement method, such as a strap, clip, rough surface, etc. While particular examples of telescoping pedal arms are shown in FIGS. 5-10, it is noted that other configurations that permit the length of the pedal arm to be adjusted without any disassembly are within the scope of this disclosure.

FIGS. 11-24 show various examples of rotating pedal assemblies that permit a pedal to rotate relative to a base portion that is attached to an end of the pedal arm. It is noted that any of the rotating pedal assemblies of FIGS. 11-24 (and their equivalents) can be combined with the telescoping pedal arms of FIGS. 5-10 (and their equivalents).

Figure 11:
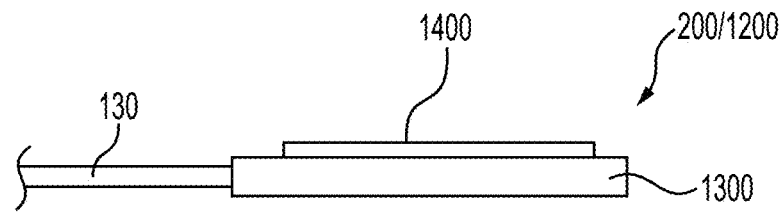
FIG. 11 is a front view of a pedal assembly in accordance with embodiments of the disclosure.

FIGS. 11-15 show an example of a rotating pedal assembly 200 that includes a pedal 1400 that rotates in a base 1300. FIG. 11 is a side view of the pedal assembly 200 attached to the first pedal arm portion 130 such that the pedal assembly 200 can swivel relative to the first pedal arm portion 130 to allow the pedal assembly 200 to remain parallel to the bottom of a user's foot or shoe while the user is pedaling the device.

In this example, the base 1300 has a main portion 1310 in which a groove 1330 extends radially outward from an interior surface 1320 of the main portion 1310. In embodiments, an upper surface of the pedal 1400 includes various features such as, for example, recesses or protrusions, to form a locking feature 1490 that is configured to engage a shoe. In embodiments, the locking feature 1490 is the same locking feature found on "clip in" pedals on racing, or other, bicycles.

Figure 12:
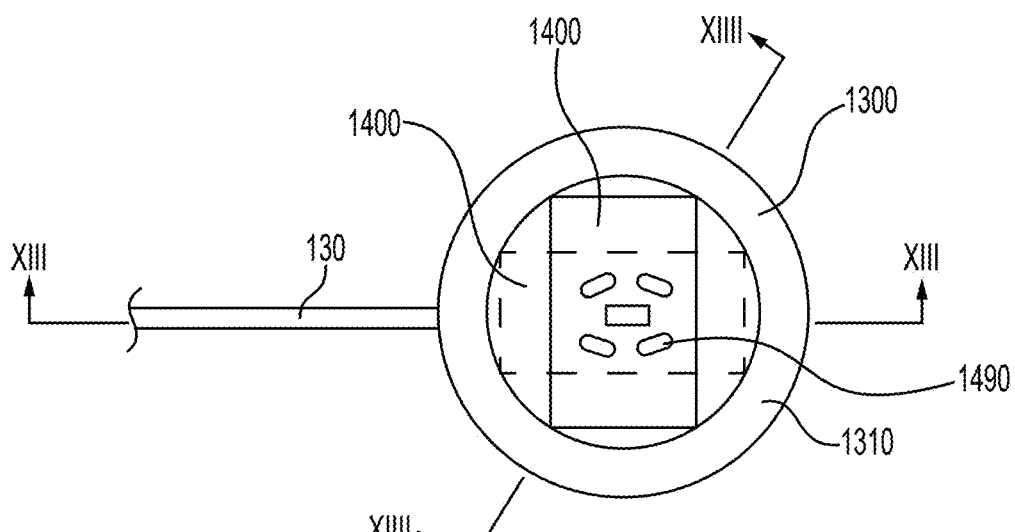
FIG. 12 is a top view of the pedal assembly of FIG. 11.
Figure 13:
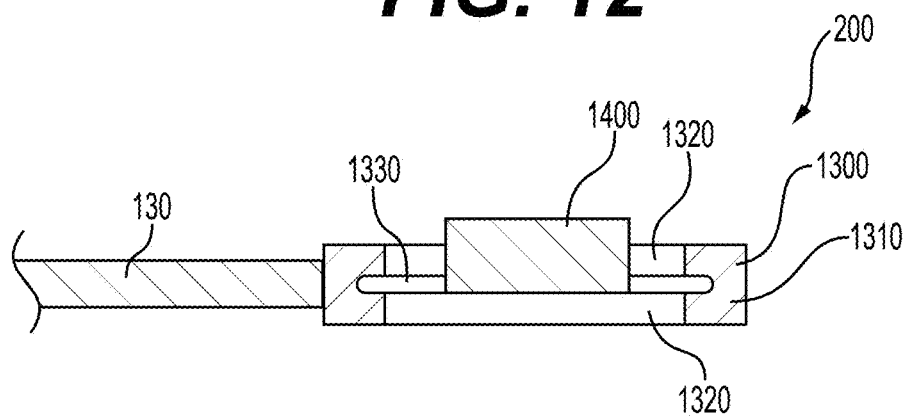
FIG. 13 is a section view of the pedal assembly of FIG. 11 taken along section line XIII-XIII shown in FIG. 12.
Figure 14:
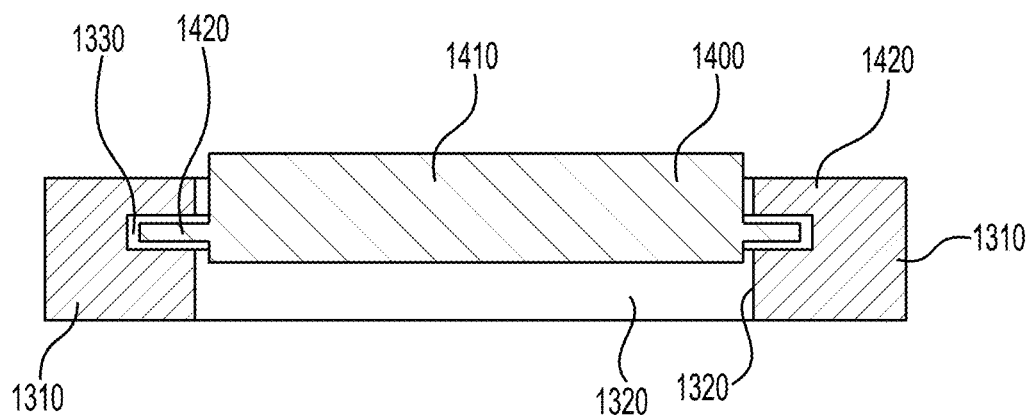
FIG. 14 is a section view of the pedal assembly of FIG. 11 taken along section line XIIII-XIIII shown in FIG. 12.

FIG. 12 is a top view of the rotating pedal assembly 200 shown in FIG. 11. FIG. 13 is a section through the rotating pedal assembly 200 taken along section line XIII-XIII in FIG. 12. FIG. 14 is a section through the rotating pedal assembly 200 taken along section line XIIII-XIIII in FIG. 12. FIG. 13 shows a section through the pedal 1400 at its narrowest point. FIG. 14 shows a section through the pedal 1400 along its longest dimension (along a diagonal).

Figure 15:
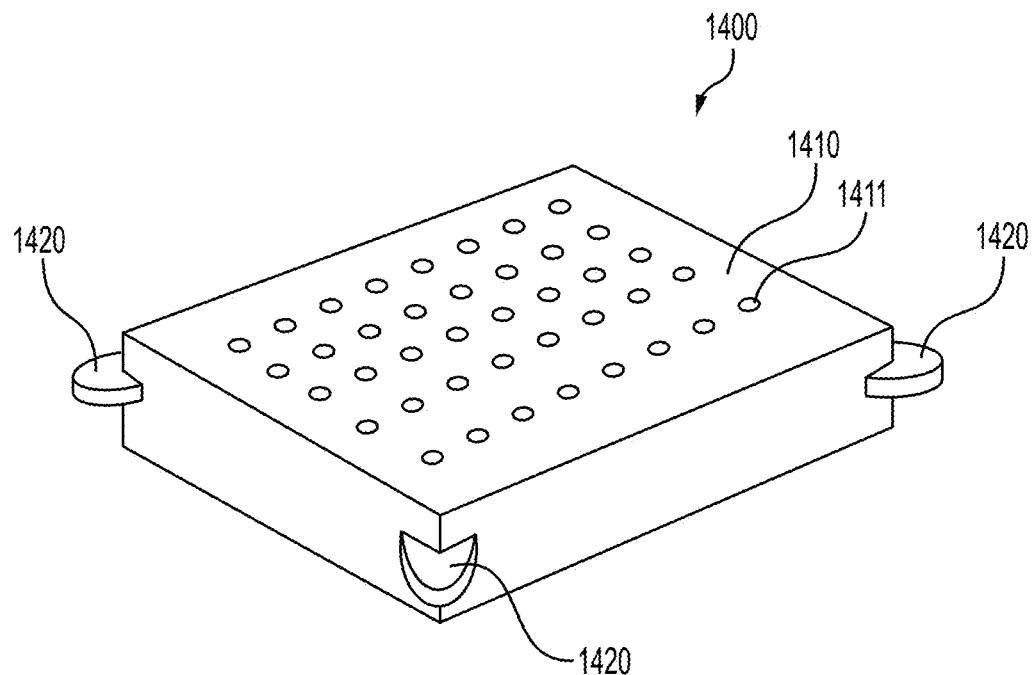
FIG. 15 is a perspective view of an exemplary pedal of the pedal assembly of FIG. 11.

As shown in FIG. 15, the pedal 1400 in this example has a pedal body 1410 and a plurality of pedal tabs 1420 extending from the petal body 1410. In this example, one of the pedal tabs 1420 extends from each corner of the pedal body 1410. The pedal tabs 1420 are configured to engage the groove 1330 in the main portion 1310 of the base 1300 such that The pedal tabs 1420 can slide within the groove 1330 when a predetermined amount of twisting force is applied to the pedal 1400 by the user. Any twisting force less than the predetermined amount of twisting force will not cause the pedal 1400 to rotate within the petal body 1410 due to friction between the pedal tabs 1420 and the groove 1330. In embodiments, a textured or rough treatment 1411 exists on the upper surface of the pedal body 1410. Examples of the textured or rough treatment include, but are not limited to, bumps, knurling, or other protrusions or surface irregularities.

In the example shown in FIGS. 11-15, the pedal 1400 extends upward above an upper surface of the main portion 1310 Such that a user's foot horseshoe contacting the pedal 1400 will not contact main portion 1310. In other examples, an upper surface of the pedal 1400 can be flush with or below the upper surface of the main portion 1310 in order to, for example, facilitate the use of shoes that have one or more protrusions that extend below the remaining portion of the soul of the shoe.

Figure 16:
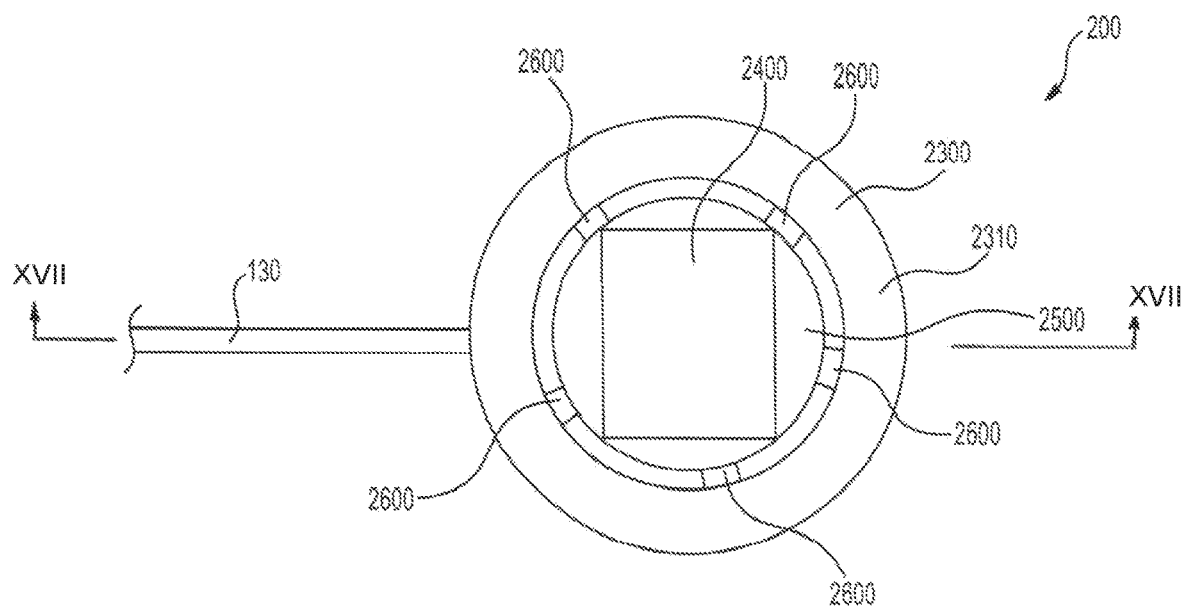
FIG. 16 is a top view of a pedal assembly in accordance with embodiments of the disclosure.

FIGS. 16-21 show an example of a rotating pedal assembly 2000 that includes a pedal 2400 that rotates in a base 2300. FIG. 16 is a top view of the pedal assembly 2000 showing a base 2300 having a main portion 2310 and a rotating portion 2500 (including pedal 2400) that rotates relative to the main portion 2310. In this example, a plurality of pedal retention portions 2600 extend between the main portion 2310 and the rotating portion 2500.

Figure 17:
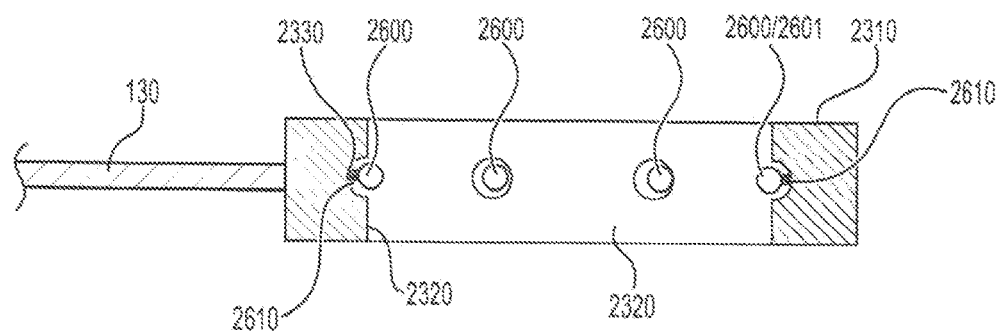
FIG. 17 is a sectional view of the pedal assembly of FIG. 16 taken along section line XVII-XVII shown in FIG. 16 with pedal 2400 removed for clarity.

FIG. 17 is a side sectional view of the pedal assembly 2000 attached to the first pedal arm portion 130 such that the pedal assembly 2000 can swivel relative to the first pedal arm portion 130 to allow the pedal assembly 2000 to remain parallel to the bottom of a user's foot or shoe while the user is pedaling the device. The rotating portion 2500 is omitted in FIG. 17 for clarity. The pedal retention portions 2600 are shown extending from recesses 2330 in an inside wall 2320 of the main portion 2310. FIGS. 16 and 17 show different numbers of recesses 2330 as an illustration of just two examples of the number of recesses 2330 (and thus the pedal retention portion 2600) that can be used. FIG. 18 shows a sectional view of an example of the rotating portion 2500 including one of a plurality of recesses 2520 in an outer wall of the rotating portion 2500. FIG. 19 is a side view of the rotating portion 2500 showing a plurality of the recesses 2520.

FIGS. 20 and 21 show exemplary pedal retention portions 2600, 2601 that are similar in design and operation to the pedal arm retention portions shown in FIGS. 7 and 10.

Figure 22:
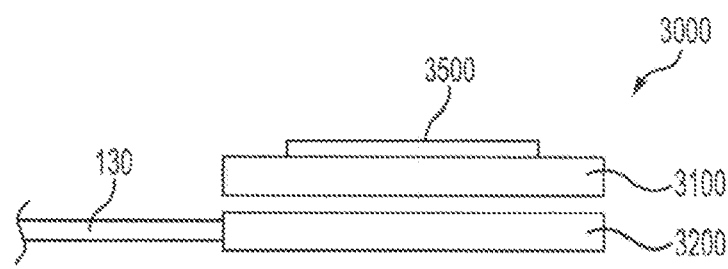
FIG. 22 is a front view of a pedal assembly in accordance with embodiments of the disclosure.
Figure 23:
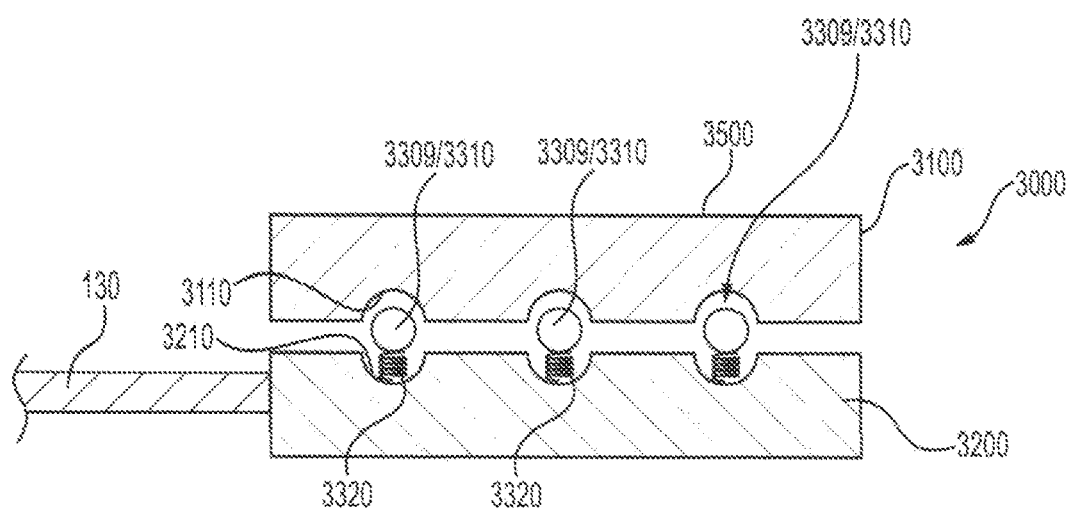
FIG. 23 is a section view of the pedal assembly of FIG. 22 taken along section line XXIII-XXIII shown in FIG. 24.
Figure 24:
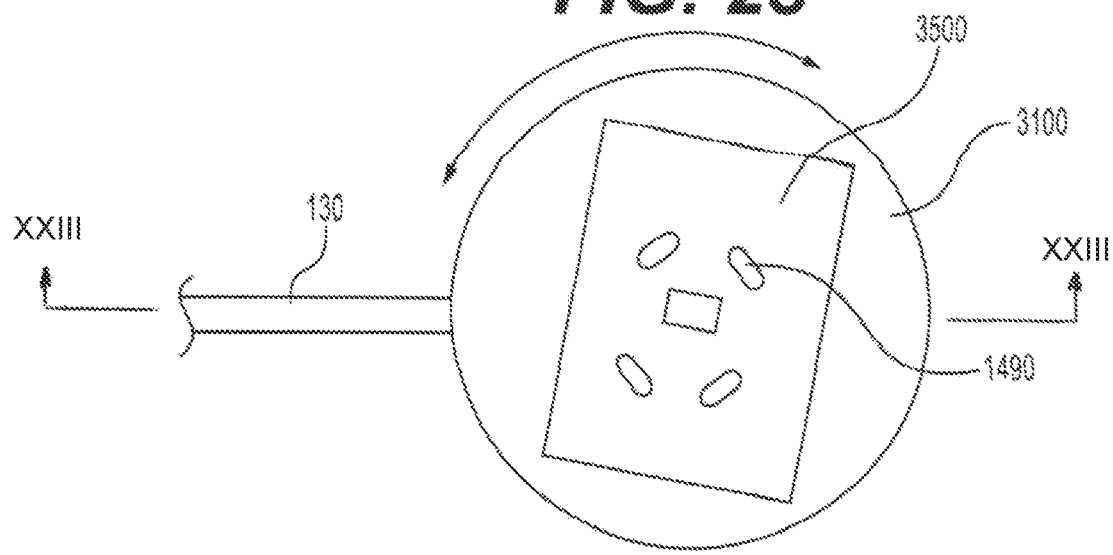
FIG. 24 is a top view of the pedal assembly of FIG. 22.

FIGS. 22-24 show an example of a rotating pedal assembly 3000 that includes a pedal 3500 that rotates relative to the first pedal arm portion 130. FIG. 22 is a side view of the pedal assembly 3000 attached to the first pedal arm portion 130 such that the pedal assembly 3000 can swivel relative to the first pedal arm portion 130 to allow the pedal assembly 3000 to remain parallel to the bottom of a user's foot or shoe while the user is pedaling the device.

In this example, the pedal assembly 3000 includes a base portion 3200 and a rotating portion 3100 that rotates relative to the base portion 3200. FIG. 23 is a sectional view of the pedal assembly 3000 showing a plurality of recesses 3110 in the rotating portion 3100, and a plurality of recesses 3210 in the base portion 3200. This example includes in each recess 3210 a pedal retention portion 3309 that is similar in design and operation to either of the pedal arm retention portions shown in FIGS. 7 and 10. As rotational force above a predetermined threshold is applied to the rotating portion 3100, the rotating portion 3100 is permitted to rotate relative to the base portion 3200 as the spheres 3310 are pressed down (against the force of the springs 3320) further into the recesses 3210. As the recesses 3110 of the rotating portion 3100 move relative to the base portion 3200, they will align with the recesses 3210 in a different rotational position and each of the spheres 3310 will engage a different one of the recesses 3110, holding the rotating portion 3100 in position until the predetermined rotating force is again exceeded.

FIG. 24 shows the upper surface of the pedal 3500 including various features such as, for example, recesses or protrusions, to form the locking feature 1490 that is configured to engage a shoe. In embodiments, the locking feature 1490 is the same locking feature found on "clip in" pedals on racing, or other, bicycles.

The embodiments described with reference to FIGS. 11-24 permit the rotational position of the pedal to be changed by a user while using the pedal operated device without having to perform any disassembly.

Figure 25:
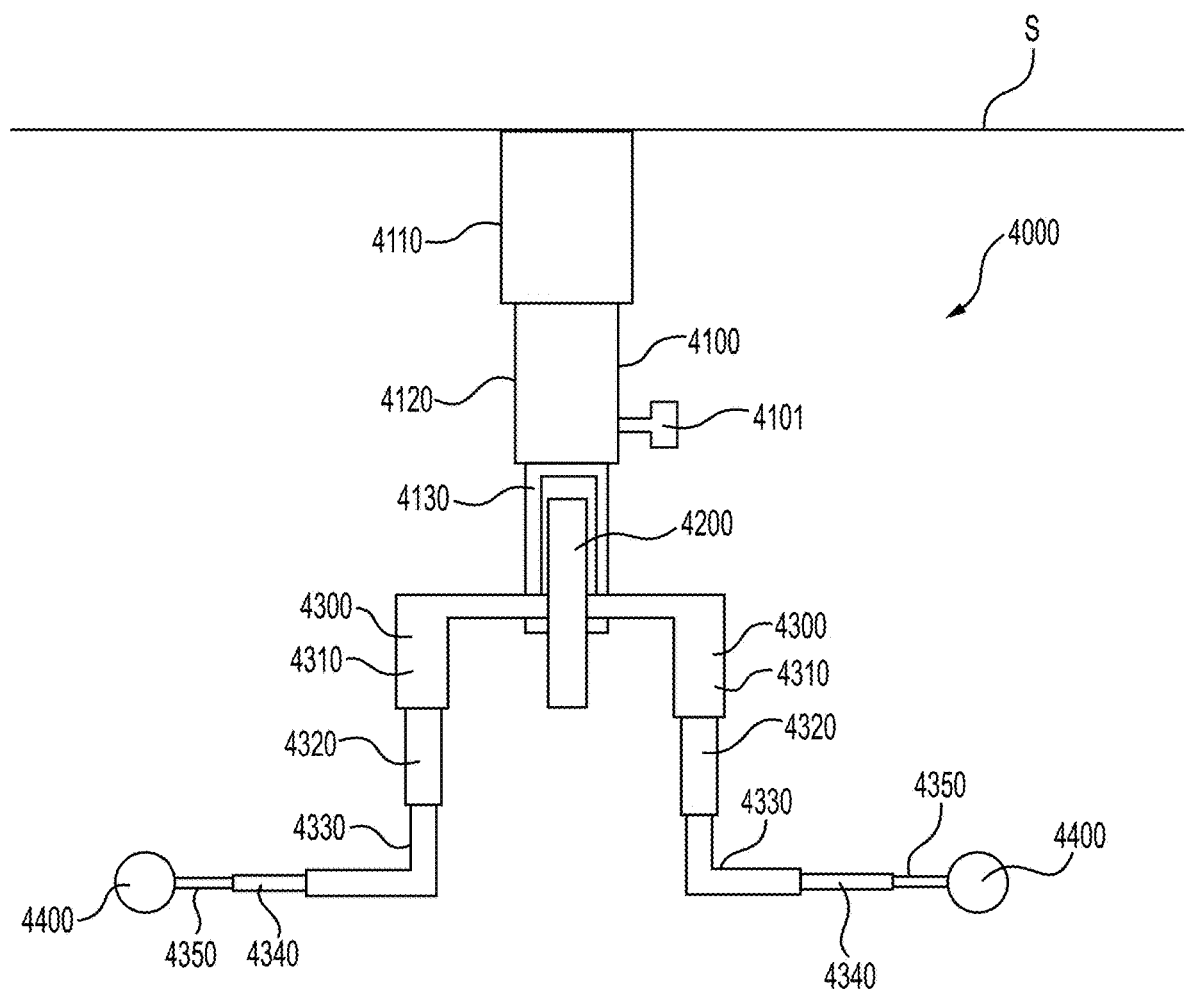
FIG. 25 is a front view of an exemplary high-mounted device in accordance with embodiments of the disclosure.

FIG. 25 shows an example of an overhead mounted device 4000 in accordance with embodiments of the disclosure. While device 4000 is described with reference to an overhead mounting arrangement, it is noted that such a device is also mountable in other orientations or locations relative to the user (such as, for example, in front of, at the same elevation as, below, and/or a part of an exercise machine that includes provisions for both arm and leg exercises, etc.). In this example, device 4000 has a telescoping assembly 4100 that extends downward from a surface S. The telescoping assembly 4100, in this example, includes a first section 4110, a second section 4120 that is configured to telescope into first section 4110, the third section 4130 that is configured to telescope into second section 4120. In this example, the third section 4130 is configured to hold a sprocket wheel 4200 that can rotate relative to the third section 4130. A tensioning mechanism 4101 is provided to allow a tension on the sprocket wheel 4200 to be adjusted. One or more pedal arms 4300 extend from the sprocket wheel 4200. FIG. 25 shows one of the pedal arm 4300 extending from each side of the sprocket wheel 4200. However, some embodiments include only one of the pedal arm 4300. Also, in embodiments that include two of the pedal arm 4300, the pedal arms 4300 can be offset from each other so that petals/grips 4400 (discussed in more detail below) are offset from each other.

Each of the pedal arms 4300 has, in this example, multiple telescoping sections that allow adjustment in two different directions. For example, a first section 4310 of the pedal arm 4300 is configured to receive a second section 4320 in a telescoping arrangement, and the second section 4320 is configured to receive a third section 4330 in a telescoping arrangement. In this example, the third section 4330 includes a 90° bend and is configured to receive a fourth section 4340 in a telescoping arrangement. The fourth section 4340 is configured to receive a fifth section 4350 in a telescoping arrangement. One of the pedal/grip 4400 is attached to the end of the fifth section 4350. The pedal/grip 4400 is configured, in embodiments, to be engaged by a user's foot and/or a user's hand. By being configured to be engaged by a user's hand, the device 4000 provides benefits to a user's arms similar to those to a user's legs as discussed in the disclosure. The various features and embodiments discussed previously in the disclosure can be applied to the device 4000.

It will be appreciated that variants of the above-disclosed and other features and functions, or alternatives thereof, may be combined into many other different systems or applications. Any of the features described above can be combined with any other feature described above as long as the combined features are not mutually exclusive. Various presently unforeseen or unanticipated alternatives, modifications, variations or improvements therein may be subsequently made by those skilled in the art which are also intended to be encompassed by the invention.

What is claimed is:

1. A pedal assembly for a pedal operated device, comprising:
    a pedal configured to receive an appendage of a user of the pedal operated device;
    a telescoping pedal arm having
        a first end,
        a second end opposite the first end, and
        a plurality of telescoping portions that move relative to each other; and
    a pedal arm retention portion that provides a predetermined resistance to the relative movement of two adjacent ones of the telescoping portions, the pedal arm retention portion having
        a first recess formed in a first one of the telescoping portions,
        a second recess formed in a second one of the telescoping portions,
        an engagement portion that is configured to be received in the first recess and the second recess, and
        a resilient portion that urges the engagement portion into one of the first recess and the second recess,
    wherein the pedal arm has a length in a longitudinal direction between the first end and the second end,
    the pedal is attached to the first end of the pedal arm,
    the second end of the pedal arm is configured to be attached to the pedal operated device,
    the plurality of telescoping portions permit the length of the pedal arm to be adjusted, and
    the pedal arm retention portion is configured such that the predetermined resistance is overcome by moving the pedal in the longitudinal direction.

2. The pedal assembly of claim 1, wherein the length of the pedal arm is adjustable without disassembling any portion of the pedal arm.

3. The pedal assembly of claim 1, wherein the pedal arm comprises
    a first portion attached to the pedal, and including the first end of the pedal arm,
    a third portion configured to be attached to the pedal operated device, and including the second end of the pedal arm, and
    a second portion attached to the first portion and the third portion.

4. The pedal assembly of claim 3, wherein the first portion telescopes inside the second portion, and the second portion telescopes inside the third portion.

5. The pedal assembly of claim 1, wherein the resilient portion is a spring.

6. The pedal assembly of claim 1, wherein the engagement portion is a sphere.

7. The pedal assembly of claim 1, wherein the engagement portion has a hemispherical end that is configured to be received in one of the first recess and the second recess, and a cylindrical end that is configured to be received in another of the first recess and the second recess.

8. The pedal assembly of claim 1, wherein each of the telescoping portions comprise a plurality of the first recess.

9. The pedal assembly of claim 1, wherein the engagement portion is pushed toward the resilient portion by one of the first recess and the second recess contacting the engagement portion as a result of the pedal moving in the longitudinal direction.

10. The pedal assembly of claim 1, wherein the pedal comprises
    a base portion that is attached to the pedal arm, and
    a rotating portion that is rotatingly attached to the base portion.

11. The pedal assembly of claim 10, further comprising a pedal retention portion that provides a rotational predetermined resistance to a rotational movement of the rotating portion relative to the base portion, the pedal retention portion having
    a first pedal recess formed in the base,
    a second pedal recess formed in the rotating portion,
    a pedal engagement portion that is configured to be received in the first pedal recess and the second pedal recess, and
    a pedal resilient portion that urges the pedal engagement portion into one of the first pedal recess and the second pedal recess.

12. The pedal assembly of claim 11, wherein the pedal retention portion is configured such that the rotational predetermined resistance is overcome by rotating the rotating portion relative to the base portion.

13. The pedal assembly of claim 12, wherein the rotating portion is rotatable relative to the base portion without disassembling any portion of the pedal.

14. The pedal assembly of claim 1, wherein the pedal is configured to receive a foot of the user.

15. The pedal assembly of claim 1, wherein the pedal is configured to receive a hand of the user.

16. A pedal operated exercise machine, comprising:
    a main body;
    a hand support;
    a seat; and
    a pedal assembly, the pedal assembly having
        a pedal configured to receive an appendage of a user of the pedal operated device;
        a telescoping pedal arm having
            a first end,
            a second end opposite the first end, and
            a plurality of telescoping portions that move relative to each other; and a pedal arm retention portion that provides a predetermined resistance to the relative movement of two adjacent ones of the telescoping portions, the pedal arm retention portion having
  a first recess formed in a first one of the telescoping portions,
  a second recess formed in a second one of the telescoping portions,
  an engagement portion that is configured to be received in the first recess and the second recess, and
  a resilient portion that urges the engagement portion into one of the first recess and the second recess,
wherein the pedal arm has a length in a longitudinal direction between the first end and the second end,
the pedal is attached to the first end of the pedal arm,
the second end of the pedal arm is configured to be attached to the pedal operated device,
the plurality of telescoping portions permit the length of the pedal arm to be adjusted, and
the pedal arm retention portion is configured such that the predetermined resistance is overcome by moving the pedal in the longitudinal direction.

17. The pedal operated exercise machine of claim 16, wherein the length of the pedal arm is adjustable without disassembling any portion of the pedal arm.

18. The pedal operated exercise machine of claim 16, wherein the pedal comprises
  a base portion that is attached to the pedal arm, and
  a rotating portion that is rotatingly attached to the base portion.

19. The pedal operated exercise machine of claim 16, wherein the pedal is configured to receive a foot of the user.

20. The pedal operated exercise machine of claim 16, wherein the pedal is configured to receive a hand of the user.

21. A pedal assembly for a pedal operated device, comprising:
  a telescoping pedal arm having
    a first end,
    a second end opposite the first end, and
    a plurality of telescoping portions that move relative to each other; and
  a pedal, the pedal having
    a base portion that is attached to the pedal arm,
    a rotating portion that is rotatingly attached to the base portion, and
    a pedal retention portion that provides a rotational predetermined resistance to a rotational movement of the rotating portion relative to the base portion, the pedal retention portion having
      a first pedal recess formed in the base,
      a second pedal recess formed in the rotating portion,
      a pedal engagement portion that is configured to be received in the first pedal recess and the second pedal recess, and
      a pedal resilient portion that urges the pedal engagement portion into one of the first pedal recess and the second pedal recess,
  wherein the pedal retention portion is configured such that the rotational predetermined resistance is overcome by rotating the rotating portion relative to the base portion.

22. The pedal assembly of claim 21, wherein the rotating portion is rotatable relative to the base portion without disassembling any portion of the pedal.

* * * * *